United States Patent
Houser et al.

(10) Patent No.: US 9,103,393 B2
(45) Date of Patent: Aug. 11, 2015

(54) SYSTEMS AND METHODS FOR HEAT SHIELD ASSEMBLIES

(75) Inventors: Joshua Craig Houser, Wapakoneta, OH (US); Katrina Lynn King, Columbus, OH (US)

(73) Assignee: Goodrich Corporation, Charlotte, NC (US)

( * ) Notice: Subject to any disclaimer, the term of this patent is extended or adjusted under 35 U.S.C. 154(b) by 369 days.

(21) Appl. No.: 13/552,334

(22) Filed: Jul. 18, 2012

(65) Prior Publication Data

US 2014/0020873 A1   Jan. 23, 2014

(51) Int. Cl.
    *F16D 65/78*   (2006.01)
    *F16D 55/36*   (2006.01)
    *F16D 65/84*   (2006.01)

(52) U.S. Cl.
    CPC .............. *F16D 55/36* (2013.01); *F16D 65/84* (2013.01)

(58) Field of Classification Search
    USPC ............... 165/135; 301/6.91, 6.2; 188/264 G; 174/153 G, 656
    See application file for complete search history.

(56) References Cited

U.S. PATENT DOCUMENTS

| | | | | |
|---|---|---|---|---|
| 3,372,441 A | * | 3/1968 | Fisher | 16/2.1 |
| 4,017,123 A | * | 4/1977 | Horner et al. | 301/6.91 |
| 4,084,857 A | * | 4/1978 | VanderVeen | 301/6.2 |
| 5,003,130 A | * | 3/1991 | Danforth et al. | 174/153 G |
| 5,627,342 A | * | 5/1997 | Kramer | 174/656 |
| 5,739,475 A | * | 4/1998 | Fujisawa et al. | 174/153 G |
| 7,051,845 B2 | * | 5/2006 | Thorp et al. | 188/71.6 |
| 2011/0247172 A1 | * | 10/2011 | Yoshii et al. | 16/2.1 |

* cited by examiner

*Primary Examiner* — Christopher Schwartz
(74) *Attorney, Agent, or Firm* — Snell & Wilmer LLP

(57) ABSTRACT

Systems and methods disclosed herein may be useful for aircraft heat shield assemblies. In this regard, a heat shield assembly is provided comprising a heat shield having an aperture, the aperture comprising an end portion and an insertion portion, the insertion portion having a width larger than the end portion, a spacer comprising an upper portion, an undermount flange and a gap between the upper portion and the undermount flange, wherein a surface of the gap is engaged with the heat shield, and wherein the undermount flange has a width less than the insertion portion of the aperture and greater than the width of the end portion.

4 Claims, 5 Drawing Sheets

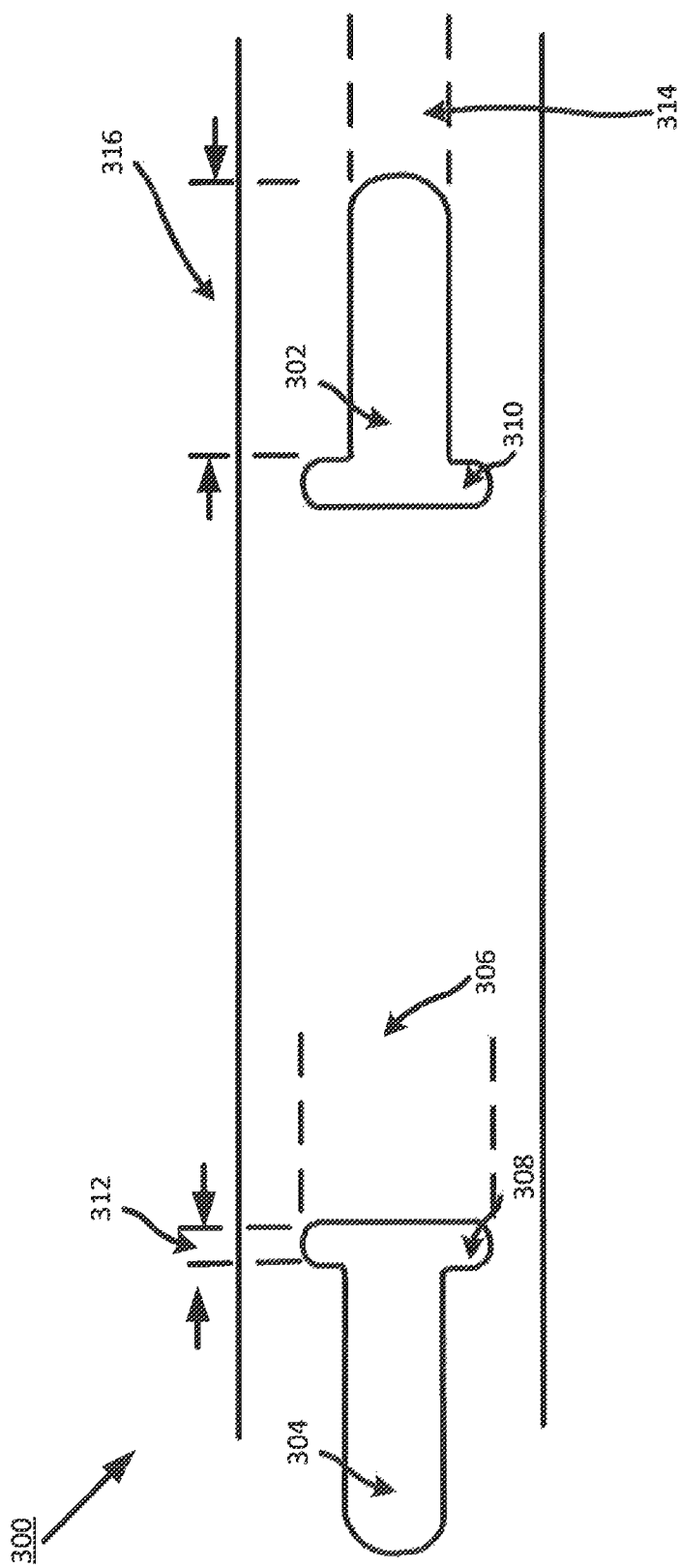

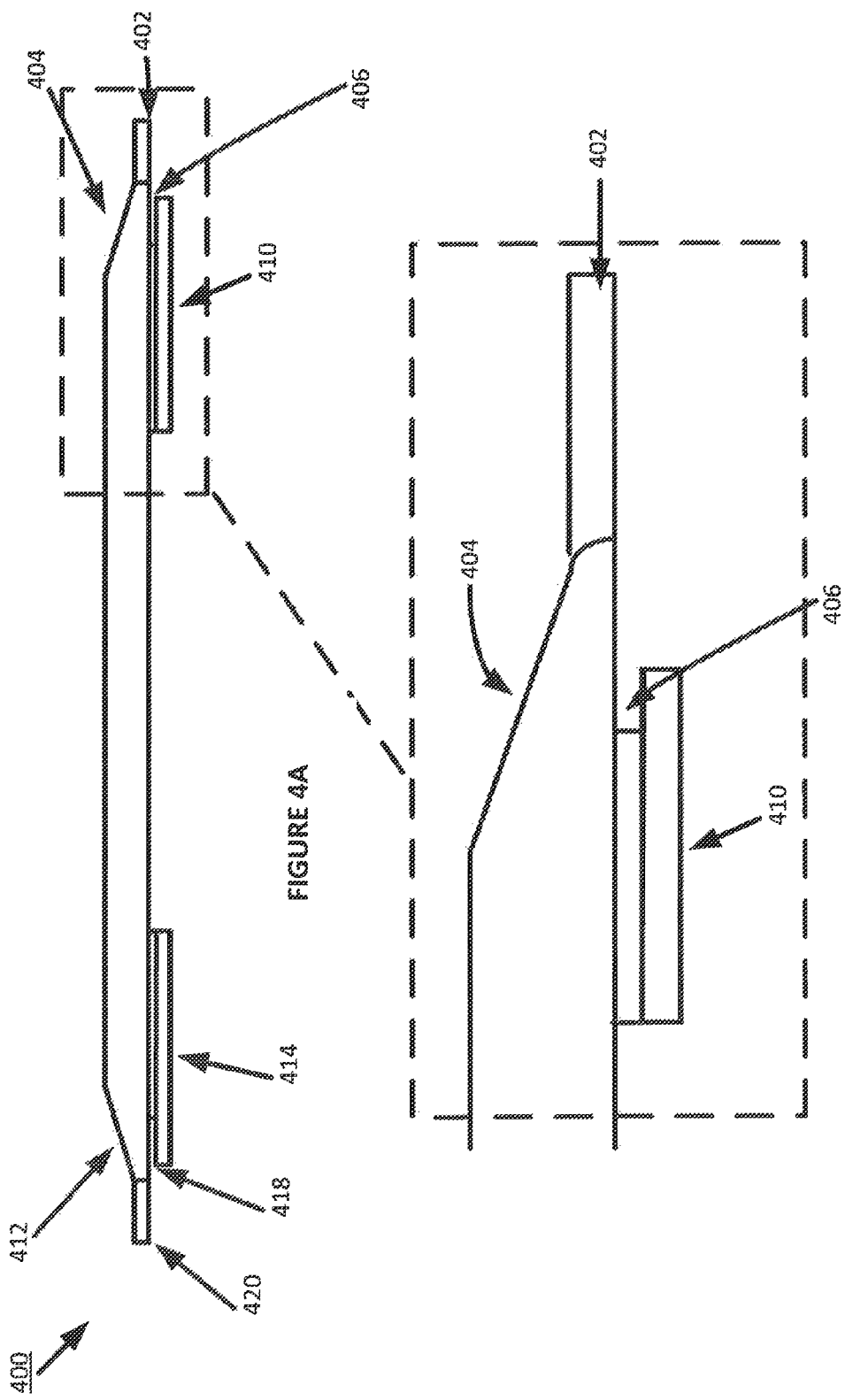

SYSTEMS AND METHODS FOR HEAT SHIELD ASSEMBLIES

FIELD

The present disclosure is related to systems and methods for heat shield assemblies.

BACKGROUND

Aircraft wheels typically comprise a heat shield that shields the aircraft wheel from heat generated by the aircraft brakes during braking. The heat shield may oscillate independently from the aircraft wheel, thus creating potential for contact between the heat shield and the aircraft wheel. Such contact may be detrimental to the aircraft wheel, especially where there is repeated contact over time. Accordingly, a spacer may be used to prevent contact between the heat shield and the aircraft wheel. A spacer and heat shield together may be referred to as a heat shield assembly. However, conventional spacers have been difficult to install and prone to damage due to improper installation. Thus, new systems and methods for heat shield assemblies are desirable.

SUMMARY

Systems and methods disclosed herein may be useful for heat shield assemblies. In this regard, a heat shield assembly is provided comprising a heat shield having an aperture, the aperture comprising an end portion and an insertion portion, the insertion portion having a width larger than the end portion, and a spacer comprising an upper portion, an undermount flange and a gap between the upper portion and the undermount flange. A surface of the gap is engaged with the heat shield, and the undermount flange has a width less than the insertion portion of the aperture and greater than the width of the end portion.

In various embodiments, a spacer is provided comprising an upper portion, an undermount flange, and a gap between the upper portion and the undermount flange, wherein the undermount flange has a width less than the upper portion. The gap extends along a length of the spacer and along a terminus of the spacer.

In various embodiments, a heat shield is provided comprising an aperture comprising an end portion and an insertion portion, and the insertion portion having a width larger than the end portion.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

FIG. 3 illustrates a heat shield in accordance with various embodiments;

FIGS. 4A and 4B illustrate a spacer in accordance with various embodiments.

DETAILED DESCRIPTION

Figure 1:
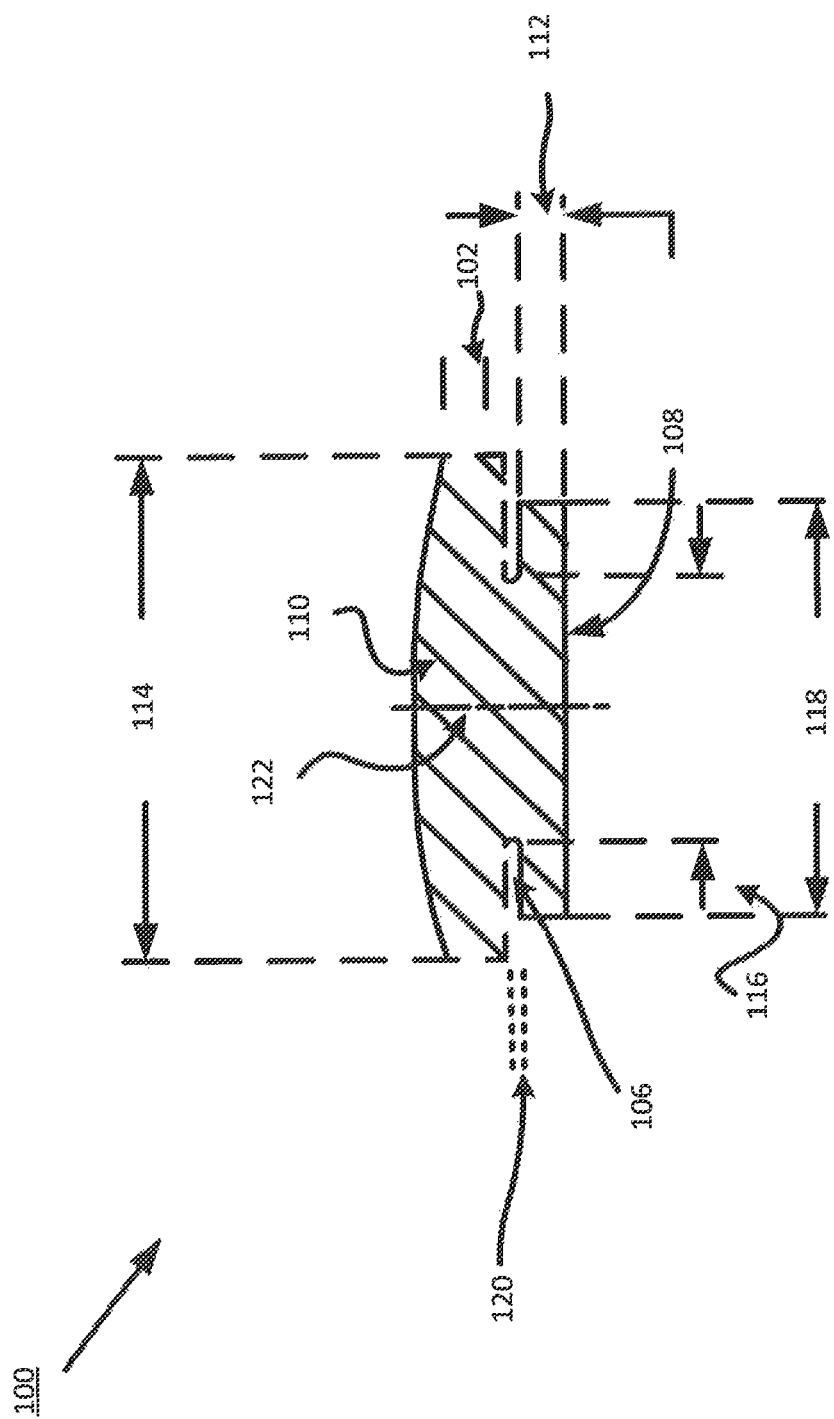
FIG. 1 illustrates a cross section of a spacer in accordance with various embodiments.

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed may be useful for heat shield assemblies. Aircraft may comprise one or more types of aircraft wheel and brake assemblies. For example, an aircraft wheel and brake assembly may comprise a non-rotatable wheel support, a wheel mounted to the wheel support for rotation, a brake disk stack (also referred to as a brake assembly), and a heat shield. An aircraft brake generally comprises a friction brake mechanism including a pressure plate adjacent to a means for exerting force such as hydraulic piston motor or one or more electromechanical actuators.

An aircraft brake typically further comprises an end plate distal from the means for exerting force and a plurality of interleaved rotor disks and stator disks which together form the brake heat sink. Each rotor disk may be coupled to the wheel for rotation therewith and each stator disk is coupled to the wheel support against rotation. The friction brake mechanism also generally includes a torque tube and a back leg on which a pressure plate, end plate and stator disks are slidably mounted against rotation relative to the wheel and rotor disks. The stator disks may comprise two wear faces and the pressure plate may comprise a single wear face. A brake head may house the piston motor or more actuator rams that extend to move the pressure plate and compress the brake disk stack against the end plate.

During braking, the brake disk stack converts the kinetic energy of the aircraft wheel to heat. Various components of an aircraft wheel and/or portions of the aircraft near the wheel may be detrimentally affected by heat from an aircraft brake. A heat shield may be disposed between the aircraft brake and the aircraft wheel to protect the aircraft wheel from heat. The heat shield may oscillate independently from the aircraft wheel during braking, thus creating potential for contact between the heat shield and the aircraft wheel. Such contact may be detrimental to the aircraft wheel, especially where there is repeated contact over time. Spacers may be used to limit such contact.

Conventionally, spacers are deformed during installation into an aircraft heat shield. The deformation may be difficult to accomplish depending upon the material of the spacer, and the deformation may damage the spacer, which may not return to its original state after the deformation. Many conventional spacers are difficult to deform and may require special tools or training. An aircraft heat shield is typically comprised of sheet metal (e.g., aluminum or steel), which may have sharp edges. Thus, a spacer could be easily damaged during installation. For example, a silicone spacer may be damaged when force is exerted against a sharp metal edge.

In accordance with various embodiments, a heat shield assembly is provided comprising a spacer and a heat shield, wherein the heat shield has an aperture for coupling the spacer and a heat shield. The spacer is configured to fit in the aperture in a manner that requires reduced deformation. This ease of installation may lessen the risk of damaging the spacer on a sharp edge of the heat shield. Moreover, easy installation reduced maintenance costs, as a spacer may be quickly replaced at regular maintenance intervals or when otherwise needed.

A spacer, according to various embodiments, may comprise an upper portion and an undermount flange. The upper portion may be adjacent to the undermount flange. For example, the undermount flange may be formed along the same thickness of the spacer as the upper portion, as shown in greater detail herein.

A gap or channel may be present between the undermount flange and the upper portion. The gap or channel may have a surface area that is configured to at least partially engage a heat shield. The size of the gap may be selected in accordance with the size of an aperture of a heat shield. The gap may run along the length of a spacer and may continue across a terminus of the spacer, though in various embodiments a gap exists only along the length of a spacer. The gap may have a width and a height, as described below.

A spacer may comprise a middle portion. A middle portion may be a portion that is selectively deformable. In various embodiments, a middle portion of a space is selectively deformable without the use of tools or machines.

Also in accordance with various embodiments, a heat shield may comprise multiple layers of metal. For example, a heat shield may comprise two to five layers of metal, for example arranged in concentric cylinders. One or more outer layers may have various apertures. An aperture on a heat shield, as used herein, may refer to an aperture in one or more heat shield layers. A heat shield aperture may comprise an end portion and an insertion portion, the insertion portion having a width larger than the end portion.

According to various embodiments, the undermount flange may be inserted into the insertion portion and slidably mounted into the end portion. The gap or channel between the undermount flange and the upper portion may engage the heat shield and provide suitable retention. In this regard, installation of the spacer does not require significant deformation. Moreover, the insertion portion allows the spacer to be inserted with reduced force against the heat shield, reducing the risk of damage to the spacer.

With reference to FIG. 1, spacer 100 is shown in cross section. Spacer 100 has upper portion 110 and undermount flange 108. The width of upper portion 110 is shown by width 114. The width of undermount flange 108 is shown by width 118. As shown, width 114 is greater than width 118. Undermount flange 108 has height 112. Upper portion 110 has height 102. The imaginary dotted line 122 in the center of spacer 100 illustrates the thickness or height of spacer 100. As shown, undermount flange 108 and upper portion 110 are adjacent to one another across the thickness of spacer 100. As used herein, width may refer to the width as measured along the direction of width 118 and height or thickness may be measured along the direction of imaginary dotted line 122.

Gap 106 is shown between undermount flange 108 and upper portion 110. Gap 106 has width 116. As illustrated in other Figures, a heat shield may be engaged to spacer 100 via gap 106. Gap 106 has height 120. Height 120 may be adapted to accept a heat shield.

Figure 2:
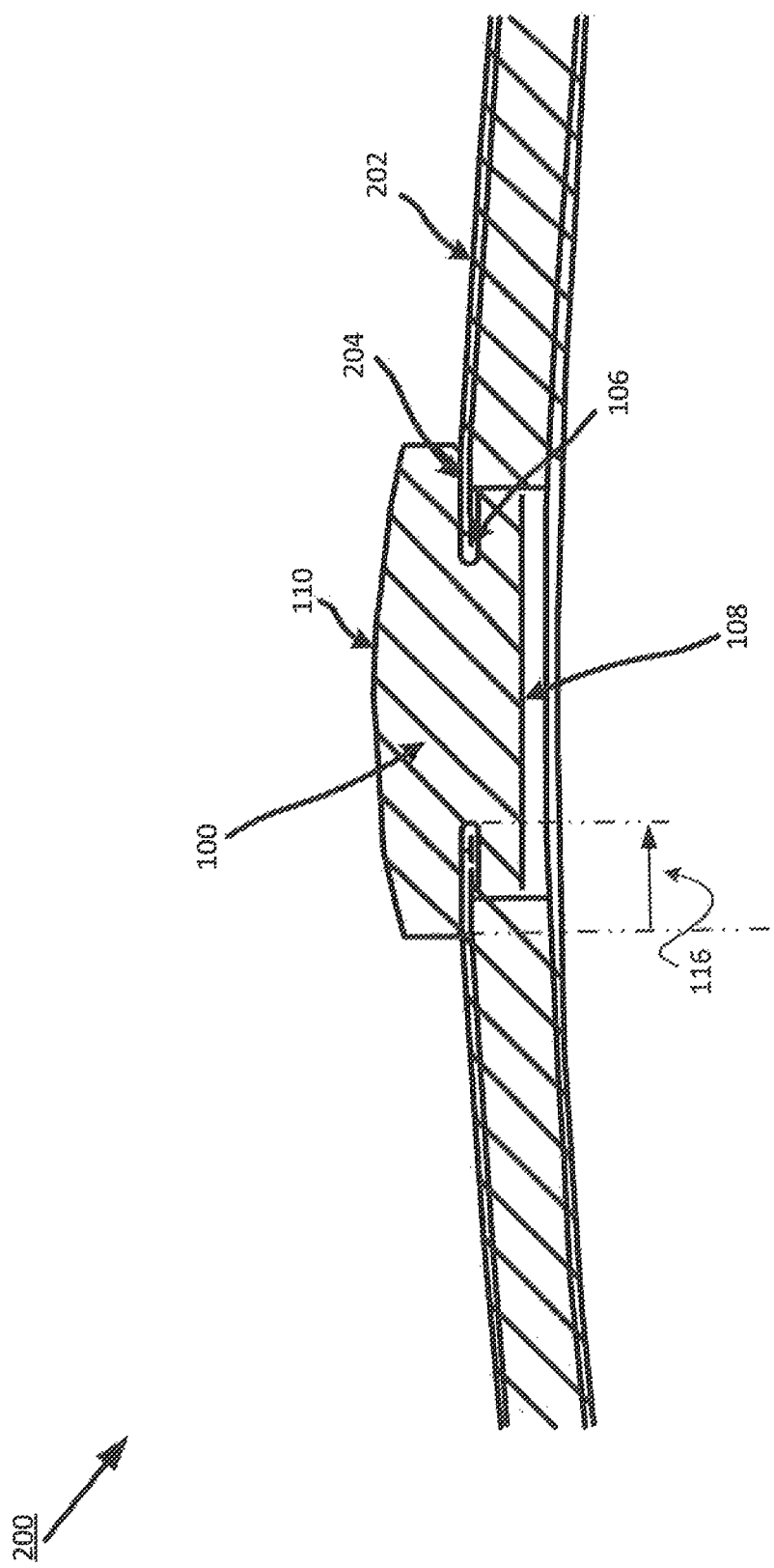
FIG. 2 illustrates a cross section of a spacer engaged with a heat shield, in accordance with various embodiments.

With reference to FIG. 2, heat shield spacer assembly 200 is shown, which includes spacer 100 from FIG. 1. Spacer 100 is engaged with heat shield 202. Upper portion 110 fits over heat shield 202 at overlap portion 204. Gap 106 is shown engaged with heat shield 202. Undermount flange 108 is illustrated below heat shield 202. As illustrated, heat shield 202 is is engaged with spacer 100 across width 116.

With reference to FIG. 3, heat shield 300 is shown. An aperture comprises insertion portion 308 and insertion portion 304. A second aperture is shown comprising insertion portion 310 and end portion 302. Insertion portion 308 has length 312 and width 306. End portion 302 has length 316 and width 314. End portion 304 has the same length and width of end portion 302. Insertion portion 310 has the same length and width of insertion portion 308.

As shown, the width of the insertion portion is greater than the width of the end portion. The insertion portion thus allows for easy insertion of a spacer into an aperture. A spacer's undermount flange may be mounted through the insertion portion, which may be of suitable width to accept the undermount flange. As the end portion has a width less than that of the insertion portion, the gap between a spacer's undermount flange and upper portion may engage the beat shield as a spacer is slidably mounted into an aperture. Stated another way, during slidable mounting, the reduced width of the end portion engages at least a part of the surface in a gap of a spacer.

An insertion portion of an aperture thus enables a slidable mounting. In that regard, after an undermount flange is inserted into the insertion portion, the spacer may be slid into the end portion. Such sliding action reduces the amount of deformation of the spacer during installation, and such deformation may be achieved without special tools or extensive training. A sliding action may be facilitated by a spacer having two undermount flanges and two upper portions. Moreover, the two undermount flanges and two upper portions may be on opposite termini of a spacer. For example, one pair of undermount flanges and upper portions may be on a distal terminus of a spacer and one pair of undermount flanges and upper portions may be on a proximal terminus of a spacer.

For example, with reference to FIGS. 4A and 4B, spacer 400 comprises two upper portions and two undermount flanges. Undermount flanges 410 and 414 are shown in spacer 400. Upper portions 412 and 404 are also shown adjacent to undermount flanges 410 and 414. Gap 406 is created between undermount flange 410 and upper portion 404. Gap 418 is created between undermount flange 414 and upper portion 412. Spacer 400 has extension portions 420 and 402. Extension portions may be used to extend spacer coverage of a heat shield. Extension portions 420 and 402 are located on the proximal and distal termini, respectively, of spacer 400. The distance from extension portion 420 to extension portion 402 may be referred to as the length of spacer 400.

Figure 5A:
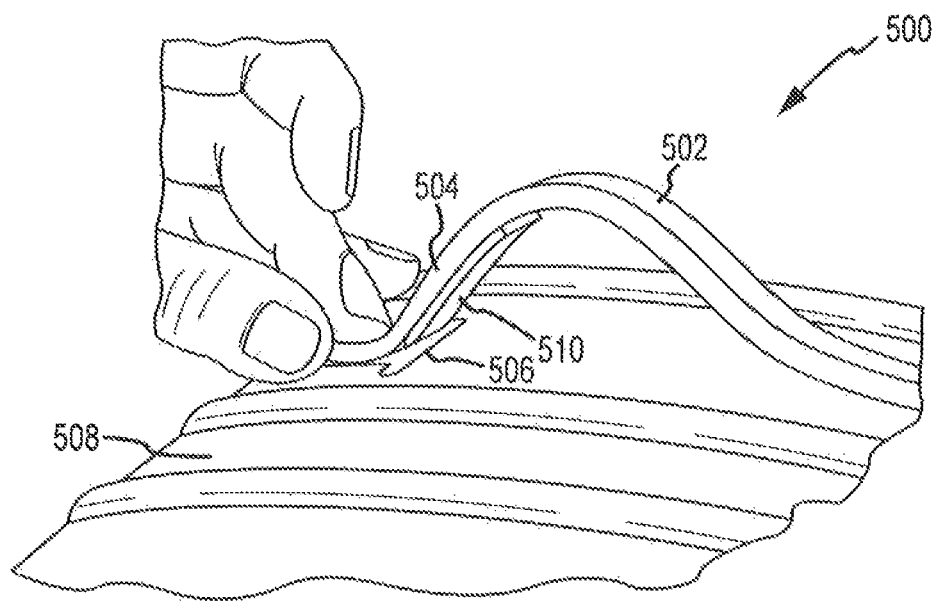
FIGS. 5A and 5B illustrate spacer installation into a heat shield in accordance with various embodiments.
Figure 5B:
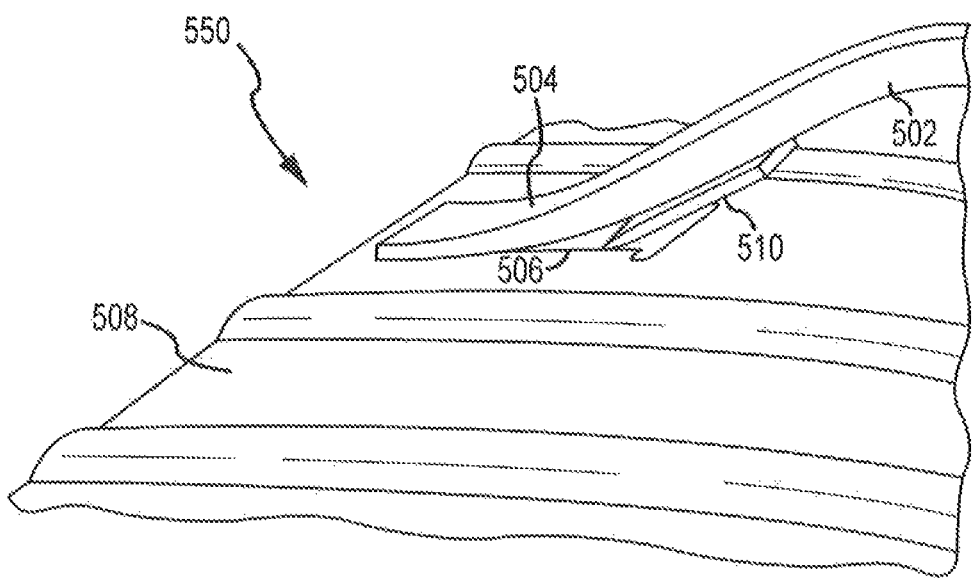

A spacer like spacer 400 may be installed into a heat shield having two apertures. Such installation is illustrated in FIGS. 5A and 5B. As shown in FIG. 5A, spacer 502 is shown in deformed state 500 during installation into aperture 506 of heat shield 508. In the deformed state, undermount flange 510 is inserted into the insertion portion of aperture 506. As the width of the insertion portion is greater than the width of undermount flange 510, undermount flange 510 is able to pass through the aperture easily.

With reference to FIG. 5B, less deformed state 550 is shown. Spacer 502 is illustrated in a less deformed state. Undermount flange 510 is shown sliding into the end portion of aperture 506. The gap between undermount flange 510 and upper portion 504 is thus able to engage heat shield 508.

Spacers in accordance with various embodiments may be comprised of any suitable material. In various embodiments, a spacer comprises silicone, synthetic polymeric material, natural rubber, or artificial rubber. Silicone may refer to one of many polysiloxane compounds. The polysiloxanes may have a chemical formula of $[R_2SiO]_n$ where R is a group such as ethyl or methyl. Silicone is commercially available from a variety of vendors in various formulations.

Spacers may be made by injection molding, carving, or any other suitable method. For example, a mold of a spacer may be filled with heated silicone so that the silicone retains the shape of the mold when cooled. Molded silicone may be cleaned or otherwise conditioned to eliminate rough edges or other artifacts of the molding process. Also for example, a monolithic piece of silicone may be carved or otherwise cut to form an undermount flange, among other features.

In various embodiments, an undermount flange of a spacer and a upper portion of a spacer are monolithic. Such embodiments are advantageous for improved strength and durability. In further embodiments, an undermount flange of a spacer and a upper portion of a spacer may be manufactured separately and joined together using, for example, glue and/or one or more fasteners.

Heat shields in accordance with various embodiments may be comprised of any suitable material. In various embodiments, a heat shield comprises aluminum, stainless steel, and alloys thereof. A heat shield is typically cylindrical in shape and may be formed by any metal working means. Apertures may be cut into the sheet metal via any suitable method. For example, apertures may be cut by a water jet, laser, torch, or blade. Apertures may also be formed by stamping. Though in various embodiments a heat shield comprises a single component, in various embodiments, a heat shield may comprise multiple, separate components or segments. Each heat shield segment may be used arranged in, for example, a cylindrical shape.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A heat shield assembly comprising:
    a heat shield having an aperture, the aperture comprising an end portion and an insertion portion, the insertion portion having a width larger than the end portion; and
    a spacer comprising an upper portion, an undermount flange and a gap between the upper portion and the undermount flange,
    wherein a surface of the gap is engaged with the heat shield, and
    wherein the undermount flange has a width less than the insertion portion of the aperture and greater than the width of the end portion.

2. The heat shield assembly of claim 1, wherein the spacer comprises silicone.

3. The heat shield assembly of claim 1, wherein the spacer further comprises an extension portion.

4. The heat shield assembly of claim 1, wherein the heat shield comprises at least two segments.

* * * * *